Feb. 19, 1974  C. E. A. SHANAHAN ET AL  3,793,412
SODIUM CHROMATE TREATMENT OF GRANULATED PIG IRON
Filed Sept. 14, 1971
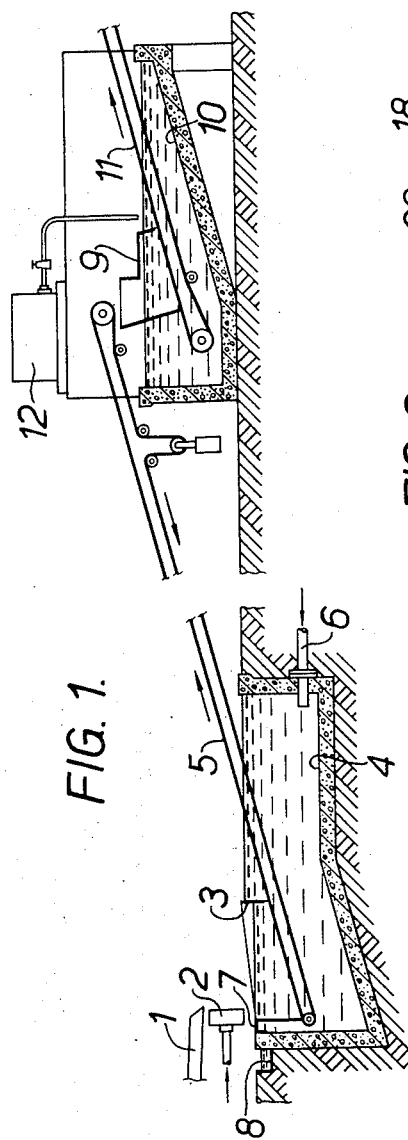
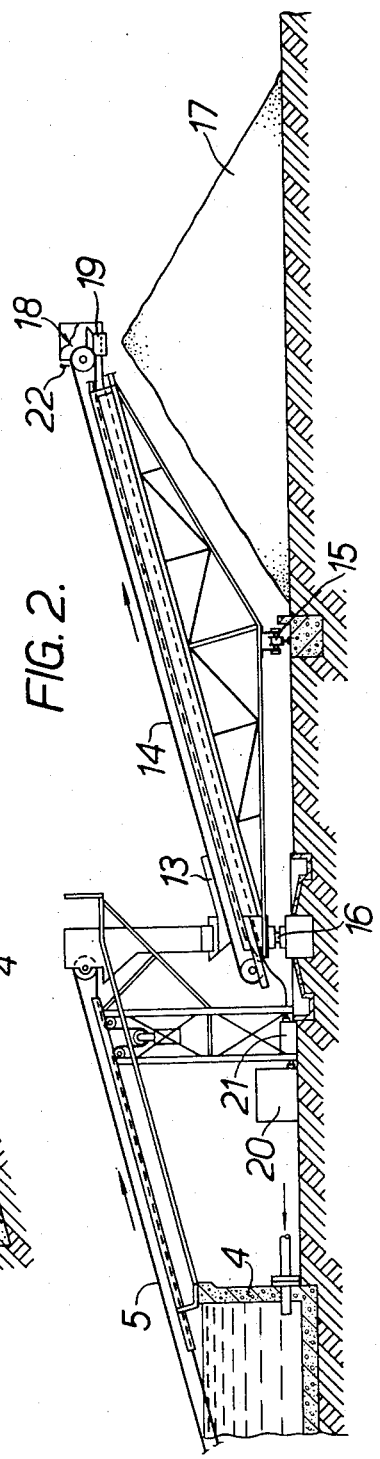
INVENTORS
CYRIL E. A. SHANAHAN
RONALD W. SCOTT
BY Nolte & Nolte
ATTORNEYS

3,793,412
SODIUM CHROMATE TREATMENT OF GRANULATED PIG IRON

Cyril Edmund Arthur Shanahan, Market Harborough, and Ronald Wilfred Scott, Blandford Forumb, Dorset, England, assignors to British Steel Corporation, London, England
Filed Sept. 14, 1971, Ser. No. 180,346
Claims priority, application Great Britain, Sept. 16, 1970, 44,221/70
Int. Cl. B01j 2/06
U.S. Cl. 264—7                                    2 Claims

ABSTRACT OF THE DISCLOSURE

The production of granulated iron in which a ribbon of molten iron is allowed to fall through the atmosphere. The falling ribbon is subjected to the action of water jets to cool and break it up into particles which fall into a water filled receiving vessel where the particles are further cooled and complete their solidification into granules. The granules are then removed from the vessel and collected. At some point during this process the granules are treated with sodium chromate to form a protective coating thereon.

---

This invention relates to the production of granulated iron.

If iron is produced in granulated from, rather than as pig iron, it is much more conveniently handled and stored for subsequent use as a raw material in steel production.

It has been proposed in the past to granulate iron for this purpose and one production process for the granulation of iron is described and claimed in British Pat. No. 800,070. In this process a ribbon of molten iron is subjected to the action of jets of water to granulate the iron which is then collected and cooled in a water-containing vessel. A modification of this basic process is described and claimed in U.S. Pat. Nos. 3,184,523 and 3,183,537.

One of the problems associated with the preparation and storage of iron granules is that if heaps of granules are stored, particularly in the open air, for any period, there is a possibility of rusting and of subsequent consolidation of the granules which makes it difficult to transport and use the granules for steel production. The period of storage and the conditions of storage of the granules vary and we have carried out extensive research into the problem of preventing or at least reducing liability to oxidation or rusting and consolidation of the granules during storage and transport.

According to one aspect of the invention, a method of producing granulated iron comprises subjecting a ribbon of molten iron to the action of water jets to cool and break up the ribbon and cause solidification wholly or partially of the iron into particles, collecting the particles in a vessel containing water which causes further cooling and final solidification of the molten metal particles into a granulated state, the granules being treated at some stage during the granulation process with sodium chromate to form a protective coating on the granules.

The sodium chromate may be applied by dissolving it in the water used in the collecting vessel. The sodium chromate may alternatively, or in addition, be dissolved in the water used to form the jets which break up the molten iron ribbon.

Again the sodium chromate may be applied to the granules after they have been cooled in the water containing vessel, or quench tank. This may be done after removal of the granules from the quench tank, and may be done in a subsequent tank containing sodium chromate solution, or may be done by spraying the granules as they are deposited on a storage heap or even by spraying the storage heap itself. Preferably the amount of sodium chromate employed is of the order of 0.1% w./v. of the water where the water is in the form of jets or in the form of bulk volume of cooling water in the vessel. By adding sodium chromate a protective layer is formed on the granules which reduces or prevents formation of extensive rusting and of a hard crust on the granules and also reduces or prevents consolidation of the granules during storage in atmospheric conditions.

In accordance with one embodiment of the invention, granulated iron is produced by allowing molten iron to flow down a channel and over a weir thus producing a vertical sheet of molten iron. The molten iron is subjected to the action of a number of jets in a similar manner to that described in British Pat. No. 800,070 so as to break up the molten iron into molten particles which are then allowed to drop into a bath containing water in which is dissolved 0.1% w./v. of sodium chromate. This results in the formation of large numbers of small iron granules which are removed by use of a conveyor which withdraws the granulated iron. The granules are then allowed to dry in air before being stacked in heaps but because of the layer of sodium chromate which dries on the surface of the granules they do not form excessive rust or consolidate during long periods of storage in atomspheric conditions even when the granules are subjected to weather conditions, such as exist in Great Britain, involving a relatively high rainfall.

Preferred alternative embodiments of the invention are illustrated in the accompanying drawings in which:

FIG. 1 is a schematic side elevation of one form of ap- of appaartus for the production of granulated iron in accordance with the invention; and FIG. 2 is a schematic side elevation of a second form of apparatus for the production of granulated iron in accordance with the invention.

In the embodiment illustrated in FIG. 1, molten iron is arranged to pass along an open topped channel 1 and fall freely as a ribbon from the open end thereof. Disposed below the end of the channel 1 is a jet block 2 provided with a plurality of bores through which water can be passed to provide water jets impinging upon the ribbon of molten iron to break it up into particles and cool and at least partially solidify it. The particles of iron fall into a reception hopper 3 disposed within a collection vessel 4 filled with water for further cooling and final solidification of the particles into granules. The bottom of the hopper 3 opens onto a conveyor 5 and the cooled granules are carried thereby out of the collection vessel 4.

It is to be noted that water is continuously circulated through the collection vessel 4 in use so as to prevent the water temperature in the vessel rising excessively. The water is fed into the vessel 4 via an inlet pipe 6 and leaves over a low level end wall 7 of the hopper 3 and vessel 4 into a discharge channel 8. The water passes from the vessel 4 into the hopper 3 before flowing away, by passing through the gap between the conveyor 5 and the bottom edges of the side walls of the hopper 3.

The iron granules are carried to the upper end of the conveyor 5 and then fall into a reception hopper 9 mounted within a treatment tank 10. The treatment tank and hopper contain a 1% w./v. sodium chromate solution, and the iron granules as they fall through the solution are intimately wetted thereby.

The bottom of the hopper 9 opens onto a conveyor 11 by means of which the granules are carried from the treatment tank to a storage heap (not shown). The quantity of sodium chromate solution in the tank 10 is maintained constant by means of a make up supply 12.

In the form of the invention shown in FIG. 2, the formation and collection of the granules (not shown) is the same as is shown in FIG. 1. In this case, however, the granules fall from the conveyor 5 (which removes the granules from the collection vessel 4) via a hopper 13 onto a storage conveyor 14 mounted on a roller 15 for movement about a pivot member 16. The granules are carried up the conveyor 14, which at the same time is arranged to move about its pivot member 16 so that a storage heap 17 of part annular plan view is built up as the iron granules fall from the upper end 18 to the conveyor.

On falling from the end 18 of the conveyor 14 the granules pass through a spray assembly 19 which is supplied by storage tank 20 and pump 21 with a 1% w./v. sodium chromate solution, whereby the granules are intimately wetted by this sprayed solution as they fall onto the storage heap 17.

Operation of the pump 21, and hence the spray 19, is controlled by means of a spade switch 22 actuated by the granules as they are carried therepast by the conveyor 14.

When the granules are used as a source of iron in the production of steel they are found to be clean and easily handled because they are not consolidated.

We claim:

1. A method of producing granulated iron comprising subjecting a ribbon of molten iron to the action of water jets to cool and break up the ribbon and cause partial solidification of the iron into particles, receiving the particles in a collection vessel containing water which causes further cooling and final solidification of the molten metal particles into a granulated state, and collecting the granules from the vessel, the granules being treated during the granulation process with sodium chromate to form a protective coating on the granules, the sodium chromate being applied to the granules by passing the granules through a sodium chromate solution in a treatment tank subsequent to removal of the granules from the collection vessel, the amount of sodium chromate used in the solution being approximately 0.1% w./v.

2. A method according to claim 1 wherein the granules are cascaded into said treatment tank of said sodium chromate solution, and are then removed from the treatment tank by a conveyor.

References Cited
UNITED STATES PATENTS

| | | | |
|---|---|---|---|
| 2,159,433 | 5/1939 | Ervin | 264—11 |
| 2,135,160 | 11/1938 | Beekhuis | 148—6.2 M |
| 2,127,202 | 8/1938 | Boyle | 148—6.2 M |

FOREIGN PATENTS

| | | |
|---|---|---|
| 800,070 | 8/1958 | Great Britain. |

ROBERT F. WHITE, Primary Examiner

J. R. HALL, Assistant Examiner

U.S. Cl. X.R.

264—11